Figure 1:
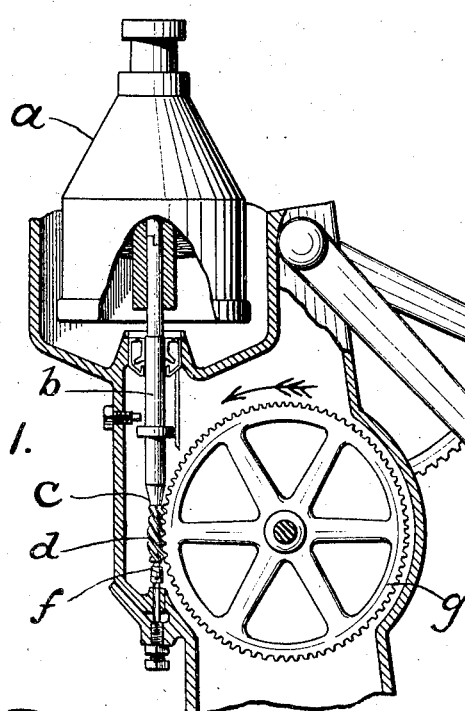

B. R. WRIGHT.
DRIVING MECHANISM.
APPLICATION FILED JULY 16, 1912.

1,058,833.

Patented Apr. 15, 1913.

WITNESSES:
Rob'. R. Kitchel.
E. E. Wall

INVENTOR
Bert R. Wright
BY
Frank L. Busser
ATTORNEY.

UNITED STATES PATENT OFFICE.

BERT R. WRIGHT, OF POUGHKEEPSIE, NEW YORK, ASSIGNOR TO THE DE LAVAL SEPARATOR COMPANY, A CORPORATION OF NEW JERSEY.

DRIVING MECHANISM.

1,058,833.  Specification of Letters Patent.  Patented Apr. 15, 1913.

Application filed July 16, 1912. Serial No. 709,632.

*To all whom it may concern:*

Be it known that I, BERT R. WRIGHT, a citizen of the United States, residing at Poughkeepsie, county of Dutchess, and State of New York, have invented a new and useful Improvement in Driving Mechanism, of which the following is a full, clear, and exact description, reference being had to the accompanying drawings, which form a part of this specification.

In some classes of machinery, particularly centrifugal cream separators, the driving shaft, which in that case is a high speed spindle carrying the separating bowl, is provided with a worm sleeved thereon and having a toothed driving clutch member adapted to coact with a toothed driven clutch member fixedly mounted so as to rotate with the driving shaft or spindle, the worm being driven by a worm wheel. In such construction, when the worm wheel is operated, the worm mounted upon the spindle or shaft is moved so that its carried toothed driving clutch member engages the shaft driven clutch member and the shaft is revolved. When the power is no longer applied, the movement of the shaft or spindle will cause the separation of the toothed driving clutch member from the driven clutch member upon the shaft, the toothed driving clutch member rising until it strikes a projection.

With centrifugal separators, the rotation of the spindle carrying the bowl is very rapid. With the construction described, after the power has ceased to be applied to the worm wheel, it often occurs that the sleeved worm will not be held in its elevated position during the slowing down and stopping of the spindle, there being periodical or even constant contact between the teeth of the worm clutch member and the teeth of the driven clutch member. This produces a clicking sound by the clutch teeth of the worm clutch member and the shaft clutch member striking each other. Moreover, such striking produces an abrasion which, in time, seriously affects the driving connection between the spindle clutch member and the worm clutch member.
I have discovered that if a slight friction be interposed between the worm sleeve and the spindle or shaft, the spindle rotation, after the application of power to the worm wheel has ceased, will cause a coaction between the worm and worm wheel to cause the worm and its clutch member to be positively lifted and held from falling. This friction should be slight, as it is not desired to keep the worm wheel in operation, except when operating the machine. The friction, therefore, should be such that this operative connection ceases when the worm rises sufficiently to strike the projection.

I have devised an effective construction for this purpose which consists in interposing a spring between the shaft and the inner surface of the worm sleeve. More specifically, I provide a longitudinal slot in the spindle in which I secure a bent wire spring, the projecting surface of which spring rests against the inner surface of the worm sleeve.

When the worm is operated, the worm clutch member is brought into coaction with the spindle clutch member and the worm clutch member acts to drive the spindle clutch member and thus the spindle. When the operation of the worm ceases driving the spindle, the sleeve clutch member tends to be lifted along the shaft or spindle. With this interposed spring, under these conditions, the worm and worm wheel will act respectively as a screw and nut, and the worm will be positively lifted.

When in the lifting the worm sleeve strikes the projection, limiting its upward movement, the resistance will cause the friction connection of the spindle and worm sleeve to be broken during further rotation and the worm wheel is no longer affected, but the worm wheel will prevent any falling of the worm sleeve until the spindle comes to rest, as any tendency to fall will cause the friction to again come into action and the just described coaction between the worm and wheel will be resumed.

I will now describe the embodiment of my invention, illustrated in the accompanying drawings, in which—

Figure 2:
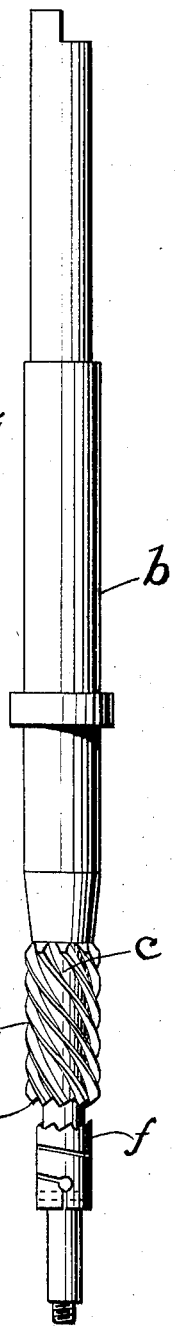
Figure 3:
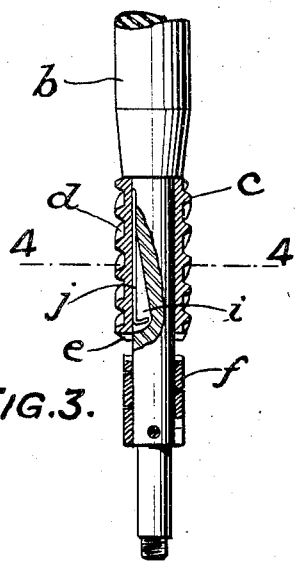
Figure 4:
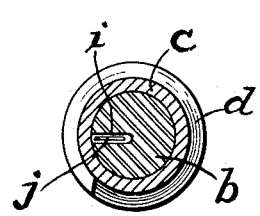

Figure 1 is a sectional view of a portion of a cream separator embodying my invention. Fig. 2 is an enlarged elevation of the spindle. Fig. 3 shows a portion of the spindle with part broken away. Fig. 4 is an enlarged section on line 4—4, Fig. 3.

$a$ is the bowl of a centrifugal separator, $b$ the driven shaft or spindle, $c$ a sleeve upon the exterior surface of which is the worm $d$. The lower surface of the sleeve is provided with the toothed clutch member $e$. On the shaft or spindle is the toothed clutch member revolving with said shaft member or spindle $f$. The arrangement of the teeth upon the worm clutch member and shaft clutch member are such that the worm clutch member drives the shaft clutch member, when the clutch members are in operative position, like a pawl and ratchet.

$g$ is a worm wheel, coacting with the worm $d$ and operated, through gearing, by the crank $h$. When the crank is turned in the direction of the arrow to operate, the sleeve carrying the worm is moved downward, so that its toothed clutch member $e$ engages the tooth clutch member $f$ of the shaft or spindle $b$.

$i$ is a longitudinal slot in the shaft or spindle $b$. In this slot $i$ is placed and secured a bent wire spring $j$, so that the spring runs lengthwise of the spindle and its projecting surface rests against the inner surface of the sleeve $c$, that is, the spring $j$ is interposed between the sleeve $c$ and the shaft or spindle $b$, upon which said sleeve is loosely mounted. When the power is no longer applied to the worm wheel $g$, through the crank $h$, the free rotation of the spindle $b$ lifts the sleeve so as to free its clutch member from the shaft or spindle clutch member. The spring $j$, heretofore described, maintains sufficient friction between the worm sleeve and the spindle to cause the worm to revolve, by coacting with the worm wheel in the manner and for the purpose hereinbefore described. When the worm wheel is again operated, through the medium of its crank $h$, the sleeve $c$, carrying the worm $d$ is positively moved along the shaft or spindle $b$ until the toothed clutch members of the worm and shaft are again in engagement, when the shaft is again revolved by the rotation of the worm wheel.

Having now fully described my invention, what I claim and desire to protect by Letters Patent is:

1. In a driving mechanism, the combination of a shaft, a worm loosely mounted on said shaft and movable lengthwise of said shaft, a driven member revolving with the shaft adapted when the worm is rotated to make driving connection between said worm and shaft and to move said worm lengthwise of the shaft when in the rotation of the shaft said worm is not driven, and a friction device tending to maintain contact between the worm and shaft in the lengthwise movement of the worm.

2. In a driving mechanism, the combination of a shaft, a worm loosely mounted on said shaft and movable lengthwise of said shaft, a driven member revolving with the shaft adapted when the worm is rotated to make driving connection between said worm and shaft and to move said worm lengthwise of the shaft when in the rotation of the shaft said worm is not driven, and a friction device tending to maintain contact between the worm and shaft in the lengthwise movement of the worm, said shaft having a stop for limiting the longitudinal movement of the worm.

3. In a driving mechanism, the combination of a shaft, a clutch member revolving with said shaft, a worm sleeved upon said shaft and having a clutch member adapted in one position of the worm sleeve to coact with the shaft clutch member, a worm wheel adapted to engage with said worm, and a friction device interposed between the interior of the worm and shaft.

4. In a driving mechanism, the combination of a shaft, a clutch member revolving with said shaft, a worm sleeved upon said shaft and having a clutch member adapted in one position of the worm sleeve to coact with the shaft clutch member, a worm wheel adapted to engage with said worm and a spring interposed between the interior of the worm and shaft.

5. In a driving mechanism, the combination of a shaft, a clutch member revolving with said shaft, a worm sleeved upon said shaft and having a clutch member adapted in one position of the worm to coact with the shaft clutch member, a worm wheel adapted to engage with said worm, and a spring fixedly secured to the shaft and contacting with said worm and against the action of which said worm lifts.

6. In a driving mechanism, the combination of a shaft, a clutch member revolving with the shaft, a worm sleeved upon the shaft and having a clutch member, a worm wheel engaging the worm and adapted when actuated to move the worm lengthwise of the shaft to bring its clutch member into driving engagement with the clutch member turning with the shaft, whereby the shaft is rotated, and means to increase the friction between the worm and the shaft, whereby, when in the rotation of the shaft the worm ceases to be driven by the wormwheel, the movement and retention of the worm out of engagement with the driven clutch member will be insured.

7. In a driving mechanism, the combination of a shaft, a driving clutch member movable lengthwise of the shaft, a driven clutch member revolving with the shaft and adapted when not driven to move the driving clutch member along the shaft out of engagement with the driven clutch member, means to actuate the driving clutch member and move it along the shaft into engagement with the driven clutch member, and means to increase the friction between the driving clutch member and the shaft whereby any tendency of the driving clutch member, when disengaged from the driven clutch member, to move back on the shaft into contact with the driven clutch member will be resisted and overcome.

In testimony of which invention, I have hereunto set my hand at Poughkeepsie N. Y. on this 3 day of July, A. D. 1912.

BERT R. WRIGHT.

Witnesses:
 JOHN B. GRUBB,
 REGINALD VANLENDEN.